June 23, 1964

R. S. WEBB 3,138,690

FAIL SAFE POWER FEED SYSTEM

Filed April 13, 1961

INVENTOR.
Robert S. Webb.
BY
M K Murphy
ATTORNEY.

June 23, 1964  R. S. WEBB  3,138,690
FAIL SAFE POWER FEED SYSTEM
Filed April 13, 1961  2 Sheets-Sheet 2
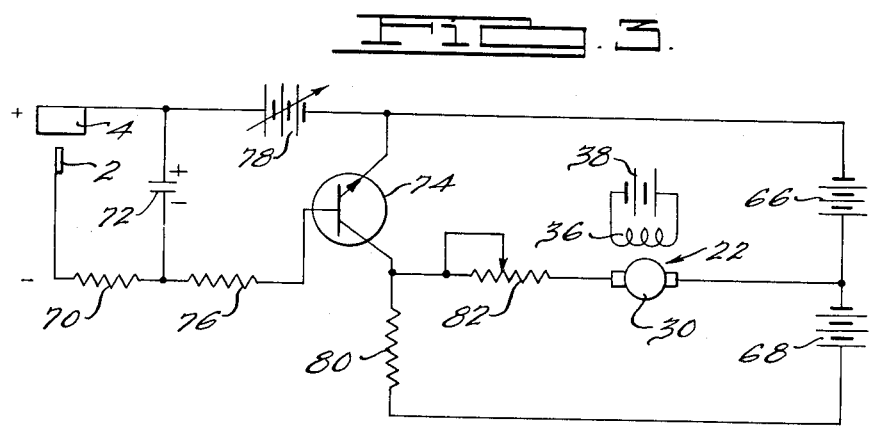
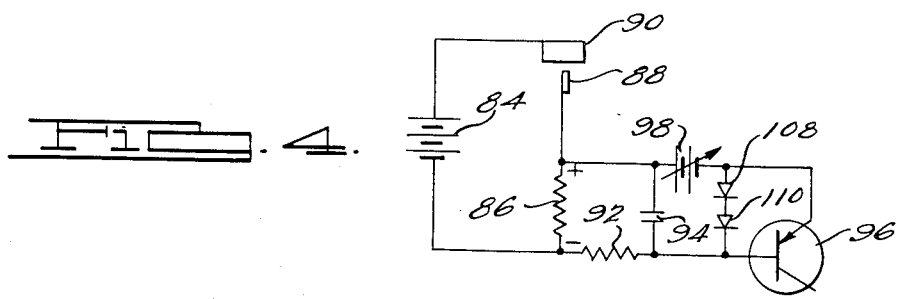
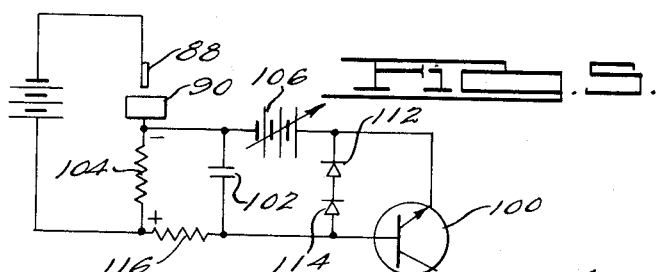
INVENTOR.
Robert S. Webb
BY
M. R. Murphy
ATTORNEY.

United States Patent Office 3,138,690
Patented June 23, 1964

3,138,690
FAIL SAFE POWER FEED SYSTEM
Robert S. Webb, Bloomfield Hills, Mich., assignor to Elox Corporation of Michigan, Troy, Mich., a corporation of Michigan
Filed Apr. 13, 1961, Ser. No. 102,679
15 Claims. (Cl. 219—69)

This invention relates to electrical discharge machining equipment and to electrical chemical machining equipment and particularly to improved control apparatus for the automatic electrode power feed mechanism used in such equipment.

Electrical discharge machining, sometimes referred to in the art as EDM, spark machining, or arc machining, is carried on by passing a series of discrete, localized, extremely high current density discharges across a gap between a conductive tool electrode and workpiece at sonic or ultrasonic frequencies in the presence of a dielectric fluid for eroding the workpiece.

Electrochemical machining, sometimes referred to in the art as ECM or electrolytic machining is carried on by passing a substantially constant unidirectional current of relatively uniform area density across a gap between a conductive tool electrode and workpiece at relatively low voltage in the presence of an electrolyte for eroding the workpiece.

In both machining processes the conductive tool is usually maintained in proximate position with the workpiece by an automatic servo feed and is advanced toward or into the workpiece as stock is removed therefrom.

A fluid coolant is circulated or flushed through the working gap, usually under pressure from a pump, frequently through a pattern of holes in the electrode. In electrical discharge machining this coolant is a dielectric such as kerosene, transformer oil, or pure water and is broken down in minute localized areas by the action of the machining power supply between the closest points of the tool and work. In electrochemical machining, a liquid such as water containing an ionizable salt such as sodium chloride, or a semisolid electrolyte is used.

In my patent, 2,962,630 issued November 29, 1960, I disclosed an improved servo feed control employing transistors for amplification of the gap signal to suitable power levels for driving the automatic servo feed motor which may include a rack or screw driven in either direction by a reversible motor through a gear box, or a ram actuated by a hydraulic cylinder controlled by an electrohydraulic servo valve.

The disclosure of that patent is directed to an extremely sensitive input circuit capable of sensing minute differences or changes in gap voltage. It is pointed out that an important advantage of the circuitry is the improved sensitivity possible through transistor amplifier circuitry connected in common emitter relationship.

The inherent limitation of the circuitry disclosed in that patent is that the transistors, or for that matter all semiconductor devices, tend to fail in a shorted condition. In every instance of transistor failure the semiconductor junction must actually fuse or short circuit at the instant of failure of the device. After such fusion, excessive currents may subsequently disintegrate the device into an open circuit condition. An extreme failure of this type in power feed circuitry properly designed is impossible. It is not uncommon, however, for a transistor to fail or become short circuited or to become partially conductive from contamination of the junction after many months or perhaps years of use or from excessive wattage dissipation, momentary short circuiting of its load circuit, or other malfunctions of the circuitry. For these reasons transistors always fail in a shorted condition which is the exact opposite of vacuum tubes which in nearly every instance fail in an open circuit condition through the disintegration of the cathode or loss of filament power.

An additional disadvantage of the circuitry disclosed in the above patent is that the transistor is rendered conductive by an increase in gap signal. This form of circuit connection inherently requires an additional limiting resistance in the base circuit of the transistor to prevent excessive current flow from damaging the transistor. This limiting resistor is shown as resistor 44 in FIG. 2 of the above patent as being series connected in the drive circuit of the amplifier thereby resulting in a loss of sensitivity.

Accordingly, it is the principal object of this invention to provide a transistorized powerfeed amplifier operating in a fail safe manner in which short circuiting of the transistor or partial leakage through the transistor causes backup of the automatic feed mechanism. In the circuitry of the above patent, short circuiting one or more of the transistors or conduction of the transistors causes downfeed and would thereby cause the electrode to feed into the workpiece upon failure of the semiconductor device. It is essential in every case, particularly with very delicate electrodes and workpieces involved in precise machining, that should a machine failure occur the electrode is retracted from the workpiece thereby failing in a safe condition without damaging the electrode or the workpiece or perhaps the machine itself.

Another object of this invention is to eliminate the need for series resistance in the delicate sensing network by reversing the phasing of the circuitry disclosed in the above patent and by a particular connection of the base-emitter circuit to the appropriate sensing network.

Another object of this invention is to employ an NPN transistor amplifier incorporating the above advantages of fail safe construction and high input sensitivity.

A further object of this invention is to provide a closed loop servo system of improved sensitivity and stability of operation particularly suitable for employment in conjunction with electrochemical and electrical discharge machining apparatus.

Other objects and advantages are disclosed in the following specification, which taken in conjunction with the accompanying drawings, show preferred forms of practicing the invention.

In the drawings in which reference numerals have been used to designate like parts herein referred to:

FIG. 3 shows still another circuit modification using two similar voltage output power supplies and an NPN transistor for sensing machining conditions, and an input of similar characteristics to that of FIG. 1 modified for NPN transistor circuitry.

FIG. 4 shows an example of a PNP circuit for sensing machining current and proper connection in accordance with the principles of this invention.

FIG. 5 shows an example of a similar connection for an NPN transistor for sensing machining current.

Figure 1:
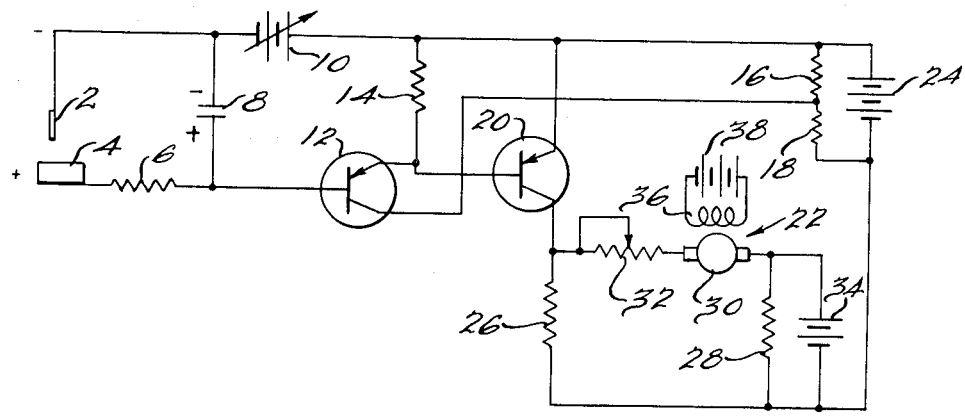
FIG. 1 shows a power feed amplifier circuit constructed in accordance with the principles of my invention employing a two stage amplifier and two unequal voltages for motor drive power.

Referring to FIG. 1 it may be seen that I have shown schematically a machining electrode 2 positioned above a workpiece 4. An averaging input network composed of a resistor 6 and a capacitor 8 provide across capacitor 8 the average or integrated voltage condition existing across the gap between electrode 2 and workpiece 4. A reference voltage 10 has its negative terminal connected to electrode 2 and its positive terminal connected through a signal resistor 14 to the emitter of transistor 12. Reference voltage 10 is connected as shown in opposed voltage relationship to the voltage stored across capacitor 8 from the machining gap.

A transistor 12 has its base connected to the positive side of the network 6–8, its emitter connected to the positive side of voltage source 10 through signal resistor 14, and its collector connected to the midpoint of a resistor network 16–18, which is shunted around a voltage source 24. The latter constitutes the backup voltage supply for power feed motor 22, as will be explained.

A second transistor 20 has its base connected to the emitter of the transistor 12, its emitter connected to the circuit at a point between resistor 14 and 16, and its collector connected to one side of the armature 30 of the feed motor through a control rheostat 32. The motor field 36 is supplied by a D.C. source 38 which may be derived from the machine input power supply.

Downfeed supply voltage for the armature 30 is supplied by voltage source 34 which is connected, in opposite polarity relationship to source 24, to the armature 30. A shunt resistor 28 is connected between one side of the armature and voltage sources 24 and 34, and a signal resistor 26 connects the other side of the armature to these sources.

As may be seen from the disclosure, conduction of transistor 12 compels the drive motor to retract the electrode from the workpiece. Low conduction of transistor 12 or an off biased condition of that transistor causes downfeed or advance of the electrode toward the work piece.

If the average voltage stored across capacitor 8 exceeds that of reference 10, a net negative voltage is applied to the emitter of transistor 12 thereby biasing it to a nonconducting condition. As the average gap voltage stored across capacitor 8 becomes slightly less than reference 10 electron flow occurs from the negative terminal of reference 10 through electrode 2, workpiece 4, resistor 6, base-emitter of transistor 12 and resistor 14 thereby rendering transistor 12 conductive. Thus, amplified electron flow occurs from the collector tap between resistors 16 and 18 through the collector-emitter of transistor 12 and signal resistor 14. A shunt electron flow also occurs through the base-emitter circuit of a transistor 20. This current is amplified by the action of transistor 20 thereby providing sufficient output power to drive a motor 22.

Conduction of transistors 12 and 20 corresponding to a condition of backup of the electrode 2 causes electron flow from a backup power supply 24 through a signal resistor 26 and power transistor 20, and a shunt electron flow through a resistor 28, motor armature 30, a control rheostat 32, and the collector-emitter circuit of transistor 20. This direction of current flow through motor armature 30 causes the electrode to be retracted.

Increased gap spacing, resulting in increased voltage across capacitor 8, reduces drive to transistor 12 to the point where a condition of null is established and this motor armature 30 remains motionless or in null condition. This occurs when the average gap voltage stored in capacitor 8 is slightly less than reference 10.

Under these conditions, transistor 12 is partially conductive, the difference in voltage being sufficient to render it approximately one-half conductive. As voltage across capacitor 8 increases, corresponding to an increase in gap between the electrode and the work piece, transistors 12 and 20 are rendered nonconductive. In this instance electron flow occurs from a drive supply 34 through resistor 26, rheostat 32 and motor armature 30; a direction of electron flow opposite that of backup thereby causing the motor to advance the electrode to maintain preset machining conditions. In the example of FIG. 1, a shunt field 36 and a D.C. supply 38 are provided indicating the use of an electric motor drive in this instance. As outlined in the above patent, these same principles apply whether an electric motor is employed or an electrically controlled electrohydraulic servo valve having the characteristics of reversing the direction of flow concurrent with the reversal of electric power furnished the armature of the servo valve as outlined in the above patent, and explained in particular in conjunction with FIGS. 4 and 5 of that patent.

With the phasing of operation permitted by the circuitry of FIG. 1, no desensitizing resistor in the base connection of the transistor is necessary. As explained herein, the elimination of this resistor is extremely important for improved or increased sensitivity and is possible only by this inverted connection of the transistor circuitry. Connection of the circuitry in this phasing not only results in any failure being in backup or failsafe condition, but in increased input sensitivity. This increase in input sensitivity is extremely important in an electrochemical machining circuit and connection in this manner improves operation of the equipment substantially.

Figure 2:
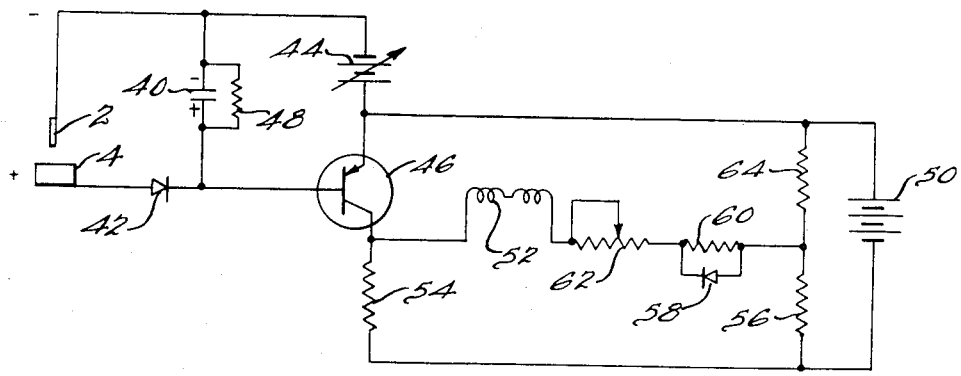
FIG. 2 shows another circuit of similar form, employing PNP transistors and including a striking voltage sensing network and a simplified output power supply derived from a single D.C. source.

FIG. 2 employs somewhat similar principles in the input and includes even greater sensitivity through the novel network employed in the sensing circuitry. The capacitor 40 in this circuit is connected to workpiece 4 through a diode 42 and has a shunt resistor 48, thus the capacitor 40 stores the "peak" or "striking" voltages which appear across the machining gap.

By "striking voltage" is meant that gap peak voltage which exists for a sufficient time just prior to each gap discharge to break down and ionize the dielectric filled gap thereby causing the discharge. The time required for the dielectric breakdown is somewhat dependent upon the magnitude of voltage for a particular gap but is in the order of a microsecond. Transient voltages of much higher voltage and much shorter duration may exist across the gap without causing breakdown and are thus not included.

The PNP transistor 46 has its base connected to the positive side of capacitor 40 and its emitter connected to positive terminal of an adjustable reference voltage 44. In this modification, a pair of electromagnetic coils 52 for controlling a hydraulic servo control valve are shown in place of an electric motor, but it is pointed out that a motor may be used for positioning the electrode if desired. The coils 52 are connected to the collector of the transistor and through a control rheostat 62 and a resistor 60 to a point between resistors 56 and 64 which are connected in series across the single voltage source 50. The resistor 60 is shunted by a rectifier diode 58 as will appear.

The first important consideration of the circuitry of FIG. 2 is that reference supply 44 in the absence of gap signal renders PNP transistor 46 conductive by causing drive electron flow from the negative terminal of supply 44 through resistor 48 directly to the base of transistor 46. Very little voltage drop occurs in the base-emitter circuit of transistor 46 with substantially all of the voltage existing across resistor 48. As gap striking voltage increases corresponding to a condition of increased gap spacing, this striking voltage is stored on capacitor 40 and replaces current flow from reference supply 44. As the striking voltage becomes sufficiently high, it maintains the average voltage across capaictor 40 equal to or slightly less than that of supply 44, thereby rendering transistor 46 nonconductive. A larger increase in gap spacing corresponding to a condition of open circuit produces a still higher voltage to be stored across capacitor 40, biasing the emitter of transistor 46 substantially negative. The important consideration of this circuit is that capacitor 40 is maintained at the reference voltage set at 44. Gap striking voltages above this reference tend to displace conduction current of reference 44 without necessarily charging capacitor 40 completely each cycle.

A condition frequently results in Electrical Discharge Machining in which the electrode is shorted and withdrawn a considerable distance and upon clearing of the gap open circuit occurs immediately. This rapid transition from short circuit to open circuit would cause damaging currents to flow in diode 42 were it not for the residual voltage stored across capacitor 40 by current flow from the reference supply. This unique circuit maintains this capacitor stored to the value of the reference voltage at all times and it is only necessary to charge capacitor 40 from the value of the reference voltage to the striking voltage corresponding, in this instance, to open circuit.

This advantage is extremely important where high striking voltage and corresponding high reference voltages are employed. Resistor 48, just as resistor 6 in the circuitry of FIG. 1, is chosen such that upon gap short circuit and maximum reference voltage setting the drive current in the base-emitter circuit of the transistor is limited to the maximum rating of the transistor. This current corresponds to many times that of the drive current required in the very sensitive region of amplification. Since the circuitry operates upon the principle of displaced current, extreme sensitivity results in the amplifying region because there is no series connected resistance in the drive loop, and because minute changes in displacement current cause corresponding changes in input drive. A transistor is biased to a condition of no conduction with approximately ½ volt drop across its base-emitter circuit. In connecting the circuit in this manner a differential change of approximately ⅛ volt or less in this circuit, with the corresponding change in drive current, results in 100 percent switching of the transistor corresponding to complete reversal from a condition of downfeed to a condition of retraction of the electrode.

The circuitry of FIG. 2 includes another important advantage over that of FIG. 1 and that is that a single power source 50 is employed for driving the motor 52. In the example of FIG. 2 servo valve control coils 52 replace the motor armature 30 in FIG. 1. It is of course clear that any of the three power circuits shown in FIGS. 1 through 3 may be employed with any of the input circuits or polarity of transistors, it being a matter of choice. Conduction of transistor 46, corresponding to a condition of backup, draws electron flow from the negative terminal of supply 50 through signal resistor 54, collector-emitter of transistor 46. During periods of full conduction of transistor 46 very low voltage drop occurs across this transistor, virtually connecting valve coils 52 to the positive terminal of supply 50. During this condition conduction occurs through resistor 56. Blocked by rectifier 58, electron flow occurs through resistor 60, speed control rheostat 62, valve coils 52, collector-emitter of transistor 46 to the positive terminal of supply 50. For approximately equal backup and down feed voltages and velocities resistors 54 and 60, 56 and 64 are approximately equal value. Full conduction of transistor 46, corresponding to full backup, connects resistors 56 and 60 in series with coils 52 through rheostat 62.

As transistor 46 is biased totally nonconductive, an electron flow occurs from the negative terminal of supply 50 through resistor 54, coils 52, rheostat 62, rectifier 58, resistor 64, to the positive terminal of supply 50. This corresponds to a condition of full downfeed and resistors 54 and 64 are therefore connected in series corresponding to approximately equal conditions of downfeed and backup for matched pairs of resistance.

Resistors 56 and 64 are equal in value and of small resistance with respect to resistor 60 and 54 thereby improving the regulation of the system.

The phasing and exact connection of this circuit is quite important and extremely simple since it can be seen that reference supply 44 is of the exact same phasing and polarity and connected in common with the machining gap. For this reason this reference may be derived from the same D.C. supply furnishing the power for gap discharge. This eliminates the need for a separate source of D.C. power.

In addition a single source of D.C. power, shown in this instance as 50, is added to provide the power feed circuitry. This single added source is connected as shown floating on the positive terminal of reference supply 44. It is of course obvious that similar circuitry could be employed by proper connection and phasing of a NPN transistor. Therefore a simple potentiometer and a single D.C. supply may replace reference supply 10 and drive supplies 24 and 34 of FIG. 1. The circuitry of FIG. 2 is extremely simplified, employs the fail safe feature outlined above and has extremely high input sensitivity.

Particularly in conjunction with servo valve coils requiring extremely low power, the cost of the necessary transformer source of A.C., rectifiers, capacitors, etc., required to produce a D.C. supply is far more costly and complicated than that produced by the corresponding supply 50 in spite of the increased power loss caused by fixed bleeders 56 and 64 connected across that supply. The power loss is insignificant and the economy great since two D.C. supplies are eliminated from the circuitry of FIG. 1.

FIG. 3 shows another modification employing two equal voltage supplies shown as 66 and 68 for the bilateral drive of motor armature 30. This circuitry is intended for use primarily for direct drive of electric motors as is the circuitry of FIG. 1, and employs separate D.C. power sources rather than the divider network of FIG. 2. In this instance the input circuitry is similar in performance to that of FIG. 1 in which resistor 70 and capacitor 72 present across capacitor 72 the average voltage of the machining gap between the electrode 2 and workpiece 4. This circuit is of opposite connection because of NPN transistor 74 having its base connected to the negative terminal of the capacitor rather than the positive connection of the base of transistor 12 in FIG. 1. A series base resistor 76 is shown in this instance and is optional as outlined above, in accordance with the degree of sensitivity of response desired. This circuit may be operated with identical sensitivity to that of FIG. 1 by elimination of resistor 76. With gap voltage equal to or below reference 78, electron flow occurs from the negative terminal of reference 78 through the emitter-base junction of transistor 74, resistor 76, resistor 70, electrode 2, workpiece 4 to the positive terminal of reference 78. Drive current corresponding to this condition of low gap voltage renders transistor 74 conductive and electron flow from supplies 66 and 68 occurs through emitter-collector of transistor 74 and resistor 80. A shunt electron flow occurs from the negative terminal of supply 66 through emitter-collector of transistor 74, rheostat 82 and armature 30 corresponding to a condition of backup. As the average gap voltage across capacitor 72 becomes only slightly less than or equal to that of reference 78, transistor 74 is rendered nonconductive. This condition corresponding to downfeed results in electron flow from the negative terminal of supply 68 through armature 30, rheostat 82, and resistor 80 in the opposite direction for that producing backup. Opposite excitation of this motor produces downfeed as in the previous circuits. Except for the fact that supplies 66 and 68 are of approximately equal voltage and electron flow is in the direction of the loops shown, performance insofar as the motor is concerned, is virtually identical for all three circuits. Field 36 excited by D.C. supply 38, armature 30, assembly 22 in FIG. 3 are identical to those of FIG. 1.

The distinguishing characteristic of all three of these circuits is that the transistor or transistor amplifier is biased nonconductive by an increase in gap voltage thereby producing downfeed and is biased conductive by a drop in gap voltage corresponding to a condition of backup. Should any of the transistors 12, 20, 46, 74 become partially conductive or short circuited due to malfunction, or contaminated within the device, or a transient circuit overload occur, the electrode is biased in a retracting position thereby failing safe without damaging the electrode or the workpiece. Since an increase in gap voltage corresponds to a condition of off-bias of the various transistors, sensitivity can correspondingly be increased by the elimination of the series base resistor. The full signal base drive current requires a range between zero and five milliamperes for full drive current. Maximum base current for a typical transistor operated in this circuit would be several amperes presenting a ratio from full drive requirement to maximum device rating of more than 1000/1 thereby presenting extremely low input impedance and high sensitivity for only one or two stages of amplification. Excess drive current flowing through any of the transistors merely renders, or tends to render, the transistor more conductive. Since only a few milliamperes current is required for full conduction or closure of the transistor in these particular circuits, the overdrive is unnecessary and harmless and results in almost no change in output velocity of the drive motor.

It will be understood that in each of the above described circuits, only the power feed sensing and control circuit of the apparatus has been shown. The gap power supply has been omitted for purpose of simplification and brevity, and description thereof is unnecessary to an understanding of the invention.

In FIGS. 4 and 5, the motive means for operation of the servo feed mechanism has been omitted, it being understood that such may be either a motor armature or a hydraulic valve (electrically controlled) and is connected in the circuit in a manner similar to that shown in FIGS. 1, 2 and 3.

FIG. 4 shows a similar circuit constructed in accordance with the aforementioned principles responsive to machining current rather than machining voltage. Such circuits responsive to machining current rather than voltage, are particularly useful in Electrochemical Machining, but also may be employed in Electrical Discharge Machining. In Electrical Discharge Machining the gap voltage as shown in the conditions of FIGS. 1 through 3 varies approximately between 20 and 80 volts or more. In Electrochemical Machining the gap voltage or drop across series resistance is usually 15 volts or less, frequently in the order of 1 or 2 volts, and therefore requires extremely sensitive amplifiers responsive to minute changes in voltage level either across series resistance or the gap itself.

FIG. 4 shows an input circuit for a PNP type transistor in which Electrochemical Machining supply 84 furnishes power through series limiting resistor 86 to electrode 88 and workpiece 90. An averaging input network consisting of resistor 92 and capacitor 94 present across capacitor 94 the average voltage occurring across resistor 86. In either Electrical Discharge Machining or Electrochemical Machinining increased current flow resulting in an increased drop across resistor 86 corresponds to a condition of too close gap spacing and therefore should signal backup of the servo feed motor. In the circuitry of FIGURES 4 and 5 this increased voltage across the signal resistor must therefore drive the transistor into conduction or be of opposite phasing from the voltage sensing circuits of FIGS. 1–3. In FIG. 4 increased drop across resistor 86, corresponding to excessive current flow, causes increased voltage across capacitor 94 and a drive electron flow through the base-emitter circuit of transistor 96 and reference supply 98. This input may be combined with any of the other three power circuits shown to drive the servo motor in which the backup condition corresponds to conduction of transistor 96.

In an opposite manner, low machining current corresponds to a condition of too large a gap spacing and requires downfeed of the servo system. Below the specific reference set by supply 98, transistor 96 is biased nonconductive, thereby producing downfeed in the manner previously described.

FIG. 5 is identical in operation to FIG. 4 except that NPN transistor 100 is connected as shown. Again as in FIG. 3 phasing is reversed for an NPN transistor and its base is now connected to the positive side of capacitor 102. Increased electron flow through resistor 104 produces drive current through reference 106 and the emitter-base circuit of transistor 100. Similarly reference 106 biases transistor 100 OFF for conditions corresponding to machining current below the predetermined level.

In this manner a fail safe circuit may be constructed for sensing either machining current or machining voltage. Since signal in this instance is in phase with conduction of the transistor, it is not possible to use the blocking characteristic of the transistor base-emitter circuit to limit drive current as described in the previous examples.

Where extreme sensitivity is required in the input circuit for a current sensing network, diodes 108 and 110 are shown connected in shunt with the base-emitter circuit of FIG. 4 and diodes 112 and 114 are shown connected in shunt with the base-emitter circuit of FIG. 5. In each case these diodes are of much higher current rating than the base-emitter circuit of the respective transistors. These diodes have the characteristic of being either silicon or germanium diodes of approximately .6 to .8 volt drop required per diode for even infinitesimal forward current flow. During normal drive characteristics the base-emitter drop of the transistor being a single diode input draws substantially all of the drive current. As the drive current becomes excessive producing more than approximately 1.5 volts drop in the base-emitter circuit, shunt electron flow is conducted through the corresponding shunt diodes. These diodes are of much higher current rating and therefore conduct the excess current with very little increase in voltage thereby limiting the base-emitter voltage to approximately 2 volts and confining the drive current to within the rating of the particular transistor thereby protecting its base-emitter diode junction by the limiting action of resistors 92 and 116. If desired these diodes likewise may be employed in the circuitry shown in FIGS. 1 through 3. However a sensitivity of this degree is usually not required in machining voltage circuits particularly in Electrical Discharge Machining. For the extreme sensitivity required in Electrochemical Machining these shunt diodes improve performance and sensitivity in sensing even machining gap voltage.

In the above drawings, the D.C. supplies are shown as batteries in the interest of simplifying the disclosure. In actual practice, these sources of D.C. are derived from the secondary of a transformer having its primary connected to the power source for the machine which may be single phase or polyphase A.C. The secondary voltage is rectified and stored, usually in an electrolytic storage capacitor to form a nearly ideal D.C. source having very low internal impedance.

In the foregoing examples, the electrode has been shown generally mounted above the workpiece and has been servofed with respect to the workpiece. In certain cases the workpiece would best be mounted above the electrode and servofed. It would be equally possible to mount both in a horizontal relationship, and in some cases feed each with respect to the other particularly in generating curvilinear surfaces. The essential portions of this invention apply equally well to any of those methods of operation.

Similarly, the examples contained herein refer to coolant holes provided in the electrode. In certain forms of operation, coolant holes may be provided in the workpiece or in both the electrode and work, it being a matter of choice in each instance.

In the above examples, the electrode is shown as connected to the negative output of the machining power supply and the workpiece to the positive output. Present day knowledge of Electrical Discharge Machining indicates that in certain specialized and improved forms of Electrical Discharge Machining that polarity may be reversed. It is essential in each case that discrete pulses of the same polarity be applied in each case and that polarity be selected in accordance with known principles. The above examples apply equally well to either polarity of machining.

It will thus be seen that I have shown and described a new and improved automatic servofeed circuitry having improved performance characteristics and employing fewer parts than other less satisfactory circuits having the important characteristic of fail safe operation and vastly increased input sensitivity. In setting forth the above examples of servo feed apparatus constructed in accordance with the teachings of this invention it is not intended to limit the invention to the above examples but only as set forth in the following claims.

I claim:

1. In combination with electrical machining equipment having means for passing electrical discharge across a gap between an electrode and a conductive workpiece for eroding said workpiece, servo means for controlling the gap spacing between said electrode and said workpiece and for maintaining said spacing substantially constant as material is eroded from the workpiece by causing relative advance of the electrode and workpiece, means for controlling operation of said servo means including a motive means and a sensing circuit operably responsive to change a single parameter of the discharge circuit of said equipment, a transistor connected between said sensing circuit and said motive means and operable between conductive and nonconductive states responsive to the output of said sensing circuit, a reference voltage connected in the base-emitter lead of said transistor for maintaining said transistor in a normally nonconductive state, said transistor operable in its conductive state to control the operation of said motive means to increase gap spacing and operable in its nonconductive state to control the operation of said motive means to decrease gap spacing, and at least one diode of relatively higher current rating and higher total conduction voltage is connected across the base and emitter junction of said transistor in like polarity with said base-emitter junction.

2. The combination set forth in claim 1 in which said parameter is gap voltage, said sensing circuit including a diode and a parallel resistor-capacitor network serially connected across the gap, and an increase in gap voltage renders said transistor nonconductive and a decrease in gap voltage renders said transistor conductive.

3. The combination set forth in claim 1 in which said parameter is gap current, said sensing circuit comprising a signal impedance connected in series with the gap discharge means, and said transistor is rendered nonconductive by a decrease in gap current and conductive by an increase in gap current.

4. The combination set forth in claim 2 in which a reference voltage is connected in opposed voltage polarity to the voltage stored across said capacitor and in series with the base-emitter circuit of said transistor, said reference voltage and said base-emitter being directly connected across said resistor capacitor network.

5. The combination set forth in claim 4 in which said reference voltage comprises a potentiometer connected to said discharge passing means.

6. The combination set forth in claim 5 including a single source of D.C. drive power voltage having a voltage divider in shunt therewith and one pole of said voltage divider connected to the emitter of said transistor and a resistor connected between the opposite pole of said voltage divider and the collector of said transistor, and means connecting the motive means of said servo between said collector and said voltage divider.

7. In combination with electrical machining equipment having a power source for passing current across a gap between an electrode and a conductive workpiece for eroding said workpiece; servo means for controlling the gap spacing between said electrode and workpiece and for maintaining said spacing substantially constant as material is eroded from the workpiece by causing relative advance of the electrode and workpiece; a motive means operatively connected to and controlling the operation of said servo means; a transistor having its principal electrodes operatively connected to and controlling the operation of said motive means; a signal impedance connected in series with the source of gap power, operatively connected to the control electrode of said transistor, and operable to increase its conductivity with increase in gap current; biasing means connected to the control electrode of said transistor to maintain it in a normally nonconductive state; said transistor operable in its nonconductive state to control operation of said motive means to decrease gap spacing and operable in its conductive state to control operation of said motive means to increase gap spacing.

8. The combination as set forth in claim 7 in which a voltage averaging network comprising a serially connected resistor and capacitor is connected across said signal impedance and coupled to said control electrode of said transistor.

9. The combination as set forth in claim 7 in which said biasing means comprises a voltage reference source connected in voltage bucking relationship with said power source between the emitter of said transistor and one plate of said capacitor, and the base of said transistor is connected to the other plate of said capacitor.

10. The combination as set forth in claim 7 in which a voltage limiting means of relatively higher current rating and higher total conduction voltage than the base emitter circuit of said transistor is connected across said base emitter circuit.

11. The combination as set forth in claim 9 in which said voltage reference source comprises a rheostat having its variable resistance serially connected said power source and said emitter of said transistor.

12. A closed loop servo system for a controlled state member comprising reversible motive means operatively connected thereto, an electrically energized element operatively connected to and controlling the operation of said motive means responsive to the direction of current flow through said element, an electronic control device having a control electrode and a pair of principal electrodes, said principal electrodes operatively connected to said element, said electronic control device providing in its conductive state a current flow in one direction through said element and providing in its nonconductive state a current flow through said element in the opposite direction, an electrical sensing network operatively connected between said member and the control electrode of said electronic control device to provide a variable voltage signal thereto characteristic of the state of said member for controlling the conductivity of said electronic control device, and a voltage limiting means connected across said control electrode and one of the aforesaid principal electrodes of said electronic control device for increasing its sensitivity of operation below a predetermined voltage level, said voltage limiting means having a relatively higher current conductivity than the junction of the aforesaid control and principal electrode above said predetermined voltage level.

13. The combination as set forth in claim 12 in which said sensing network includes a capacitor, said capacitor and a reference voltage source being serially connected across said principal electrode and said control electrode of said electronic control device.

14. The combination as set forth in claim 12 in which said electronic control device comprises a transistor connected in common emitter relationship and said voltage limiting means comprises at least one diode shunted across the base-emitter junction of said transistor in like polarity therewith, said diode having a relatively higher current rating than said base-emitter junction.

15. The combination as set forth in claim 12 in which said motive means comprises an electrically operated motor and said element comprises a motor control winding therefor.

References Cited in the file of this patent
UNITED STATES PATENTS

| | | |
|---|---|---|
| 2,846,629 | Clark et al. | Aug. 5, 1958 |
| 2,939,065 | Matulaitis | May 31, 1960 |
| 2,962,630 | Webb | Nov. 29, 1960 |